United States Patent [19]

Akiyama

[11] 4,205,137

[45] May 27, 1980

[54] BASIC MATERIAL FOR MAKING A POROUS MATERIAL FOR SEALS

[75] Inventor: Osamu Akiyama, Kobe, Japan

[73] Assignee: Bando Chemical Industries, Ltd., Hyogo, Japan

[21] Appl. No.: 820,943

[22] Filed: Aug. 1, 1977

[30] Foreign Application Priority Data

May 2, 1977 [JP] Japan .................................. 52-51050

[51] Int. Cl.2 ................................................ C08J 9/36

[52] U.S. Cl. .................................... 521/145; 264/126; 264/321; 521/74; 521/918

[58] Field of Search ................. 428/402, 195, 64, 262, 428/65; 260/2.5 F; 526/200, 2.5 P

[56] References Cited

U.S. PATENT DOCUMENTS

| | | | |
|---|---|---|---|
| 3,038,867 | 6/1962 | Czepiel | 260/2.5 F |
| 3,042,665 | 7/1962 | Jankowski et al. | 526/200 |
| 3,047,538 | 7/1962 | Steinmann | 260/2.5 F |
| 3,090,763 | 5/1963 | Hillier | 260/23 |
| 3,164,559 | 1/1965 | Erberl et al. | 260/2.5 F |
| 3,205,204 | 9/1965 | Heckmaier et al. | 526/200 |
| 3,375,238 | 3/1968 | Bauer et al. | 526/200 |
| 3,640,918 | 2/1972 | Fuchs et al. | 260/2.5 P |
| 3,663,520 | 5/1972 | Balwe et al. | 526/200 |
| 3,696,181 | 10/1972 | Bonner, Jr. | 260/2.5 P |

*Primary Examiner*—Morton Foelak
*Attorney, Agent, or Firm*—Wenderoth, Lind & Ponack

[57] ABSTRACT

Basic material for making a porous material for seals comprising powder produced by pulverizing a plastic foams selected from the group consisting of gelated foams and semi-gelated foam of polyvinyl chloride.

6 Claims, 3 Drawing Figures

BASIC MATERIAL FOR MAKING A POROUS MATERIAL FOR SEALS

FIELD OF THE INVENTION

This invention relates to a basic material for making a porous material for seals which is suitable for molding.

DESCRIPTION OF THE PRIOR ART

As to the conventional porous material for seals having relief characters, various manufacturing processes are available such as (1) the extraction method whereby soluble, solid and fine powder, which can be dissolved and extracted by water or by solvents, is mixed in rubber material or resin, such mixture is made into a sheet and then is molded by means of heating and pressing, and finally said solid and fine powder is extracted to form a continuous foam; (2) a porous, thermoplastic foam prepared beforehand is heated and pressed at such a temperature as molding is possible and then is cooled to form a material for seals; (3) the sintering method whereby a continuous foam is formed by bonding thermoplastic resin powder particles with one another by means of sintering at a temperature below the melting point.

However, referring to the extraction method (item (1) above), it is required, for obtaining a pore structure of continuous porosity and the porosity suitable for absorbing and discharging ink, to mix a large quantity of solid, very fine powder and extract it after molding. Accordingly, this method has such disadvantages that physical property of basic material for seals is lowered, time and equipment are required for mixing and extracting and dimensional change is caused by extracting fine powder with resultant difficulty in obtaining a material for seals of uniform quality, and residual liquid after extracting must be disposed of.

With regard to the method of item (2) above, it dispenses with the extraction process and can produce easily a porous material for seals having relief characters but cannot produce deep and acute-angled molding of relief characters (up to 0.4 mm ) because of the flexibility of foam. Even if the deep and acute-angled molding can be obtained by a high temperature and high pressure treatment, a problem is raised as to the melting of porous surface of characters and resultant reduction by half of ink absorbing and discharging function.

The sintering method (item (3) above ) dispenses with the extraction and other processes and can produce easily a porous material for seals but since it sinters thermoplastic resin powder which is not perfectly dissolved, it involves low strength and dimensional shrinkage in molding. Moreover, difficulty is found in manufacturing material resin powder in large quantities, at low cost and in uniform quality.

Of the above three methods having both merits and demerits, the sintering method is judged to be superior to the others as the method which dispenses with a complicated process such as extracting and can produce easily the material for seals having deep-molded relief characters. With this in view, studies have been made on the sintering method. The following types of thermoplastic resin powder have so far been used generally as basic material for making material for seals by the sintering method.

(I) Thermoplastic elastomer is dissolved in a solvent which can dissolve elastomer and the solution thus obtained is soaked in a precipitant in the state of film, roll, etc., and then dried and pulverized, or the above-mentioned solution sprayed into a precipitant and the powder precipitated is dried, whereby powder of super fine continuous structure in irregular shape is obtained.

(II) Polyvinyl chloride powder is wetted with a plasticizer and is granulated by bonding particles.

In the case of item (I) above, however, since a poisonous and volatile solvent, such as dimethyl formaldehyde, is used for dissolving elastomer, problems are raised as to the collection of solvent and the environmental protection. Moreover, difficulty is found in producing the required powder in very fine grain size and in uniform quality, on mass production basis.

In the case of the item (II) above, it is impossible to compound a plasticizer at more than 60 weight parts to 100 weight parts of polyvinyl chloride, with the result that the foam obtained is poor in elasticity, especially in resistance to low temperature.

In addition to the above items (I) and (II), it comes into our mind to use polyvinyl chloride powder to be obtained by dry-mixing polyvinyl chloride and a plasticizer but the material for seals obtained by the sintering method using this powder has porosity of 50% at the maximum and is restricted in the quantity of a plasticizer to be compounded as in the case of the item (II) above.

SUMMARY OF THE INVENTION

In view of the above, the present inventor has made studies on the powder for sintering required to obtain excellent porous material for seals which eliminates the defects of conventional thermoplastic resin powder to be used for the above-mentioned sintering method. The present invention is the fruit of such studies.

The present invention has as an object to provide basic material for making a porous material for seals comprising powder which is obtained by pulverizing gelated or semigelated foamed polyvinyl chloride.

The nature and advantages of the present invention will be understood more clearly from the following description made with reference to the accompanying drawings, in which:

DETAILED DESCRIPTION OF PREFERRED EMBODIMENTS

Figure 1:
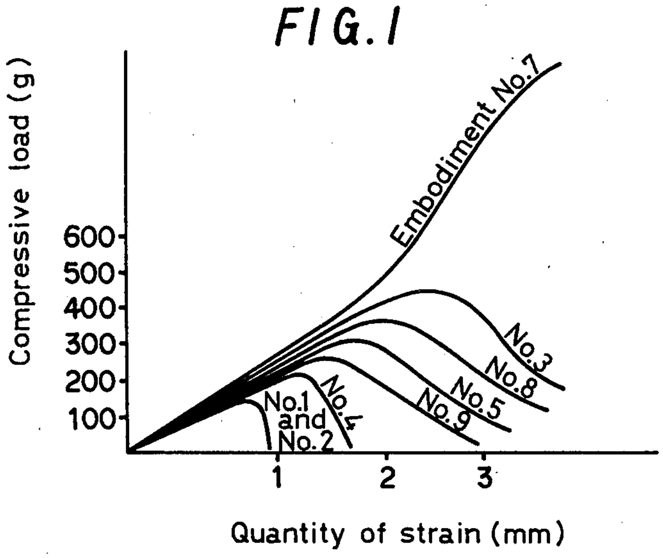
FIG. 1 shows compression-strain curves of semi-gelated foams in Embodiments No.1–No.9 of the present invention.

The basic material for making a porous material for seals according to the present invention comprises powder which is obtained by pulverizing gelated or semi-gelated foamed polyvinyl chloride.

The above-mentioned gelated or semi-gelated polyvinyl chloride is obtained by foaming polyvinyl chloride plastisol by means of mechanical or chemical foaming and then by gelating it or by semi-gelating it (to discontinue gelating at the stage where strength is not displayed fully). The gelated or semigelated foam thus obtained has a continuous porous structure and a fine structure which allow ink absorbing and discharging but has fragile physical property to such an extent that it can be pulverized easily.

As to the method of foaming the above-mentioned polyvinyl chloride plastisol, it is already known to spray mechanically a gas, such as the air, $CO_2$ gas, etc., into plastisol containing a foam stabilizer or to heat, foam and gelate plastisol after adding a chemical foaming agent, such as sodium bicarbonate. As to the condition of semi-gelating mentioned above, it is necessary to heat foamed polyvinyl plastisol at 100°–180° C. for 2–30 minutes, preferably at 145°–165° C. for 5–10 minutes, although the treating condition should vary with the compounding of resin.

With regard to the method of pulverizing, it is possible to loosen physically the above-mentioned gelated or semi-gelated substance into powder or the conventional ball mill, pulverizer, etc. can safely be used. For fine powdering it is desirable to effect cold-pulverizing at −10° C.∼−170° C.

The powder according to the present invention obtained in the above way is in the state of spongy chip. Its grain size ranges from tens to hundreds (20–300μ in general). Its internal structure is such that it has continuous pores of around 1–30μ and is porous. For practical use, powder is passed through a sieve of 40-mesh after pulverizing. Preferably, powder should be passed through a sieve of 80-mesh but since the powder structure is porous, a wide distribution of grain sizes will give no trouble. However, if grain size is larger than 40-mesh, powder cannot be filled minutely along the concave surface of parent molds and as a result, acute-angled molding of relief characters cannot be obtained.

The bulk specific gravity of the above-mentioned powder can be varied easily by varying a foaming multiple of starting foam, but against 0.2–0.3 apparent specific gravity of starting foam, the bulk specific gravity of powder obtained is 0.1–0.4. The bulk specific gravity of 0.2–0.4 is desirable for a porous material for seals but in order to obtain such material powder the specific gravity of starting foam should preferably be 0.3–0.5, especially 0.35–0.45 is the best. Thus, by controlling the specific gravity of starting foam (namely, the foaming multiple) the bulk specific gravity of powder can be varied as desired. Therefore, density of sintered foam (porosity) can be controlled freely. A detailed explanation is given below with regard to concrete embodiments of the present invention.

In Embodiments No.1–No.7, polyvinyl chloride plastisol of the same compounding ratio was used, but gelating or semigelating conditions and pulverizing conditions were varied. Polyvinyl chloride plastisol was prepared by mixing various chemicals as shown below.

| | |
|---|---|
| Polyvinyl chloride paste resin (degree of polymerization: 1800) | 100 parts by weight |
| DOP | 40 parts by weight |
| BBP | 30 parts by weight |
| DOA | 10 parts by weight |
| Stabilizer | 2 parts by weight |
| Foam stabilizer (surfactant) | 10 parts by weight |

Foamed plastisol was obtained by blowing the air into the polyvinyl chloride plastisol by means of a continuous foaming machine. In Embodiment No.1, plastisol was foamed by using a foaming multiple by which the apparent specific gravity of its semi-gelated foam becomes 0.38, was semi-gelated by heating at 145° C. for 10 minutes and was pulverized manually into powder. In Embodiment No.2, semi-gelated foam in the case of Embodiment No.1 was cold-pulverized in liquid nitrogen into powder. In Embodiment No.3, powder was obtained in the same way as Embodiment No.1, with the exception that heating was carried out for 15 minutes instead of 10 minutes in the case of Embodiment No.1. In Embodiment No.4, powder was obtained in the same way as Embodiment No.1, with the exception that heating was carried out at 165° C. for 5 minutes instead of at 145° C. for 10 minutes in the case of Embodiment No.1. In Embodiment No.5, powder was obtained in the same way as Embodiment No.4, with the exception that heating was carried out for 10 minutes instead of 5 minutes in the case of Embodiment No. 4. In Embodiment No. 6, powder was obtained in the same way as Embodiment No.1, with the exception that the apparent specific gravity of semi-gelated foam was set at 0.50. In Embodiment No.7, foamed plastisol was perfectly gelated.

In Embodiments No.8 and No.9, the compounding ratio of polyvinyl chloride plastisol was varied as shown in the following table 1

Table 1

| | Embodiment No. 8 (part by weight) | Embodiment No. 9 (part by weight) |
|---|---|---|
| Polyvinyl chloride paste resin (degree of polymerization: 1800) | 100 | 100 |
| DOP | 30 | 50 |
| BBP | 25 | 40 |
| DOA | 5 | 10 |
| Stabilizer | 2 | 2 |
| Foam stabilizer (surfactant) | 10 | 10 |

In Embodiments No.8 and No.9, plastisol was prepared by mixing at the above compounding ratio and foamed plastisol was obtained by getting the air mixed in automatically and continuously by a continuous foaming machine. This foamed plastisol was semi-gelated by heating at 165° C. for 10 minutes and semi-gelated foam thus obtained was pulverized manually. The apparent specific gravity of this semi-gelated foam is 0.38 but can be varied within the range from 0.30 to 0.50 by varying the air quantity to be mixed in. Heating was carried out by a heating machine of hot air circulating type but the reflected heat method or the high frequency heating method is applicable.

The following Table 2 shows characteristics of gelated or semi-gelated powder in Embodiments No.-1–No.9 and also characteristics of porous foam obtained by sintering the above-mentioned powder.

Table 2

| Embodiment No. | 1 | 2 | 3 | 4 | 5 | 6 | 7 | 8 | 9 |
|---|---|---|---|---|---|---|---|---|---|
| Gelling or semi-gelling condition | | | | | | | | | |
| Temperature (°C.) | 145 | 145 | 145 | 165 | 165 | 145 | 165 | 165 | 165 |
| Duration (min.) | 10 | 10 | 15 | 5 | 10 | 10 | 30 | 10 | 10 |

Table 2-continued

| Embodiment No. | 1 | 2 | 3 | 4 | 5 | 6 | 7 | 8 | 9 |
|---|---|---|---|---|---|---|---|---|---|
| Apparent density of gelated or semi-gelated foam (g/cm$^3$) | 0.38 | 0.38 | 0.38 | 0.38 | 0.38 | 0.50 | 0.38 | 0.38 | 0.38 |
| Method of pulverizing (remark 1) | M | C | M | M | M | M | C | M | M |
| Percentage of pulverization (%) (remark 2) | 80 | 98 | 22 | 60 | 40 | 80 | 85 | 55 | 35 |
| Bulk specific gravity of powder (g/cc) (remark 3) | 0.30 | 0.33 | 0.28 | 0.30 | 0.26 | 0.39 | 0.30 | 0.31 | 0.26 |
| Density of sintered foam (g/cm$^3$) (remark 4) | 0.43 | 0.48 | 0.44 | 0.48 | 0.39 | 0.54 | 0.42 | 0.40 | 0.38 |
| Ink absorbing speed (sec./mg) (remark 5) | 1.4 | 1.4 | 1.2 | 1.3 | 1.1 | 2.2 | 1.6 | 1.6 | 1.2 |
| Compressive strength of gelated or semi-gelated foam (g/mm$^2$) (remark 6) | 2.0 | 2.0 | 6.5 | 8.0 | 4.5 | 8.5 | no breaking | 4.8 | 3.3 |

(Remark 1) M: Manual pulverizing, C: Cold-pulverizing
(Remark 2) Percentage of passing through a sieve of 40-mesh
(Remark 3) Substances passed through a 40-mesh sieve.
(Remark 4) Sintered at 165° C. for 7 minutes into 5m.m. thickness at 25% compressibility.
(Remark 5) Ink of 300 cps ink viscosity (at 25° C.) was dripped by 10–15mg and the time during which ink was absorbed entirely by sintered foam was measured.
(Remark 6) The value obtained by dividing the maximum load when a specimen (10m.m. $\phi$ × 10m.m. thick) was compressed at a compressing speed of 1m.m./min. by an autograph (made by Kabushiki Kaisha Shimazu Seisakusho), by the sectional area of the specimen.

From the above Table 2, it can be seen that in each of Embodiments No.1–No.9, pulverization can be carried out easily, the structure of powder is porous and spongy and in chip state, and sintered foam obtained from such powder has high strength, high ink absorptivity and a minute surface structure. "The semi-gelated state" used in the above explanation means, for example, the state in which breakdown takes place in the compression-strain curves of semi-gelated foams shown in FIG. 1. FIG. 1 shows the result obtained by measuring the specimen (10 mm $\phi \times$10 mm thickness) of the above-mentioned embodiments which was compressed by an autograph at the compressing speed of 1 m.m./min. The semi-gelated foam in each of the embodiments can be sufficiently used for the present invention but from the viewpoint of easiness of pulverization and the development of strength due to fusing in sintering, the semi-gelated state in which breakdown takes place by low strain as in the case of Embodiments No.1 and No.2 is desirable.

Figure 2:
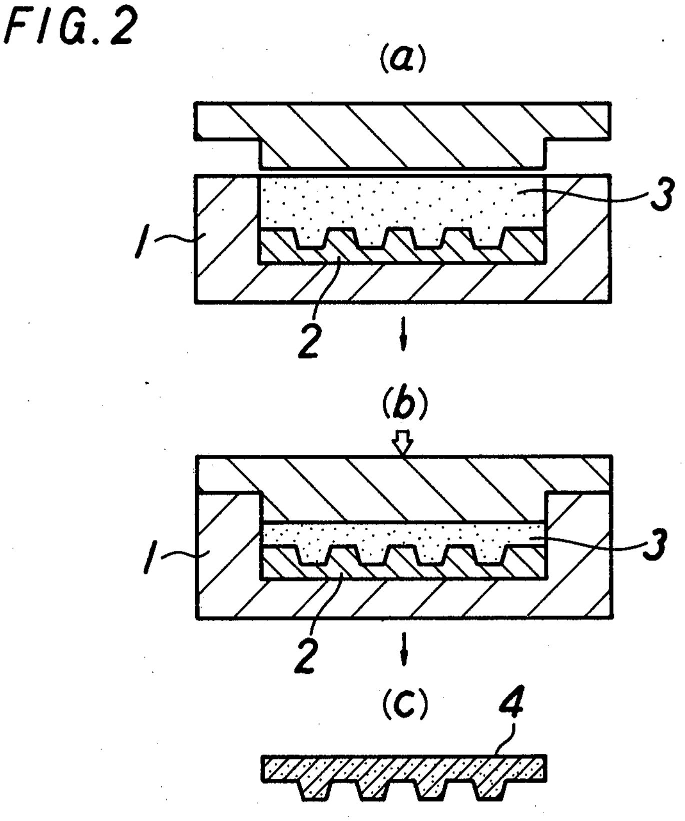
FIG. 2 and FIG. 3 are respectively a process chart showing an example of the method of making a porous material for seals, using a powder according to the present invention.

An explanation is made below on the method of manufacturing the seal foam, using a basic material for making a porous material for seals according to the present invention, by the sintering method. As shown in FIG. 2, porous gelated or semi-gelated fine powder 3 in the quantity 1.2–1.5 times more than the volume of a cavity at room temperature is filled in concave parts of a parent mold 2 with carved characters which is set in a metallic mold 1, is subjected to heating and pressing for 20–25 minutes in a heating press at 150° C., is cooled down to the room temperature and then is taken out of the parent mold 2. In this way, a porous material for seals having acute-angled relief characters and high ink absorptivity and dischargeability can be obtained.

Figure 3:
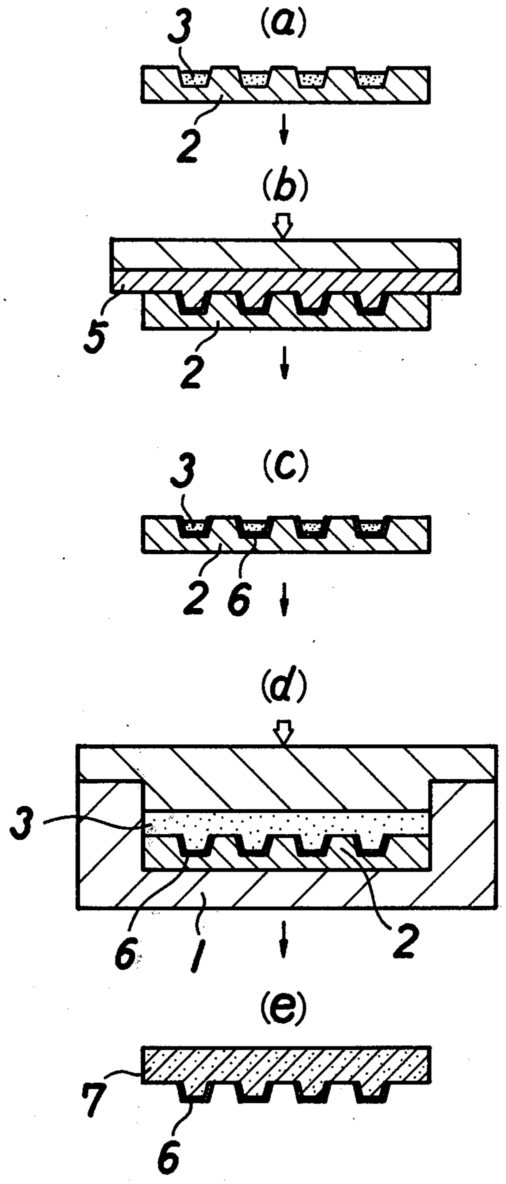

As shown in FIG. 3, a porous material for seals having acute-angled carved relief characters and high ink absorptivity and dischargeability can be obtained in the following way. Porous gelated or semi-gelated fine powder 3 is filled uniformly at room temperature in the concaved parts of the parent mold 2. A rubber convex plate 5 molded from the parent mold 2 is placed upon the filled powder 3 in such a fashion that it engages exactly with the concaved parts of the parent mold 2 and the powder 3 is compressed uniformly by load of 0.5–1 kg/cm$^2$, whereupon a seals layer 6 is formed. Powder 3 is again filled upon the seals layer 6. This re-filled parent mold 2 is put in the metallic mold 1 of the prescribed thickness and powder 3 in the quantity 1.2–1.5 times more than the volume of the cavity is further filled in the cavity. Powder 3 filled in the metallic mold 1 and the parent mold 2 is subjected to heating and pressing for 20–25 minutes in a heating press at 150° C., is cooled down to the room temperature in the pressed state and is taken out of the parent mold 2.

Material for seals 4, 7 obtained in the above way has a deep, acute-angled relief characters and holds ink in a comparatively large quantity, making it possible to carry out sealing of high frequency, for example, if water ink of 100 cps viscosity is filled in, sealing of 20,000–50,000 times is possible without replenishing of ink.

As explained above, according to the present invention thermoplastic powder for sintering which is a basic material for making a porous material for seals can be obtained easily without using a solvent and without employing a special means such as cold-pulverizing. Moreover, gelation and semi-gelation involves foam for seals of high strength because of fast fusing of particles with one another in sintering. Since the above-mentioned powder can be filled in minutely and uniformly along the concaved surface of the parent mold, material for seals having deep and acute-angled relief characters can be obtained. Because this material for seals is of minute and continuous porous structure, it is excellent in ink absorbing and discharging. Furthermore, because a plasticizer can be mixed in large quantities, sintered foam has high elasticity and resistance to low temperature.

The powder according to the present invention can be used as a basic material for stamps, i.e. ink rolls, sponge molds in complicated shape, etc., as well as material for seals.

What is claimed is:

1. A moldable composition for making a porous stamp, which composition is made by a process comprising:
(a) forming a polyvinylchloride plastisol from polyvinylchloride and a plasticizer;
(b) foaming the plastisol of step a);
(c) gelating or semigelating the foamed plastisol of step b), said gelated or semigelated foam having an apparent specific gravity of 0.3–0.5; and
(d) pulverizing the gelated or semigelated foamed plastisol of c).

2. The moldable composition according to claim 1 wherein semigelated foamed polyvinylchloride is pulverized.

3. The moldable composition according to claim 1 wherein gelated foamed plastisol is frozen and then pulverized.

4. The moldable composition according to claim 1 having an internal structure of continuous pores of about 1 to 30 microns.

5. A moldable composition according to claim 1 wherein the semigelation is performed by heating the plastisol.

6. The moldable composition according to claim 1 wherein the heating is performed at 100°–180° C. for 5 to 10 minutes.

* * * * *